United States Patent [19]

Kitchen

[11] 4,019,463
[45] Apr. 26, 1977

[54] LEASH WITH SLIP LOOP

[76] Inventor: Earl M. Kitchen, 1025 E. Lomita St., Glendale, Calif. 91205

[22] Filed: Oct. 30, 1975

[21] Appl. No.: 627,243

[52] U.S. Cl. .............................. 119/109; 119/153
[51] Int. Cl.² .................................... A01K 27/00
[58] Field of Search .......... 119/109, 105, 106, 126, 119/130; 24/115 H, 163 R, 114.5, 262, 184, 198, 182; 248/499; 54/34, 85

[56] References Cited

UNITED STATES PATENTS

| | | | |
|---|---|---|---|
| 579,899 | 3/1897 | Scurr | 54/34 |
| 805,573 | 11/1905 | Messenger | 24/182 |
| 1,615,586 | 1/1927 | Kleffman | 24/129 B |

FOREIGN PATENTS OR APPLICATIONS

| | | | |
|---|---|---|---|
| 295,038 | 4/1914 | Germany | 119/153 |
| 859,856 | 1/1961 | United Kingdom | 119/109 |

*Primary Examiner*—Louis G. Mancene
*Assistant Examiner*—Peter K. Skiff
*Attorney, Agent, or Firm*—Clarence A. O'Brien; Harvey B. Jacobson

[57] ABSTRACT

An animal leash with slip loop having a slip connector unit associated with the slip loop so that said loop may be adjusted in size according to the size of the neck of the animal with which it is to be used. A simplified embodiment is also provided which allows for simple adjustment of the slip loop without the use of a connector as detailed as in the preferred embodiment.

4 Claims, 6 Drawing Figures

U.S. Patent  April 26, 1977  4,019,463
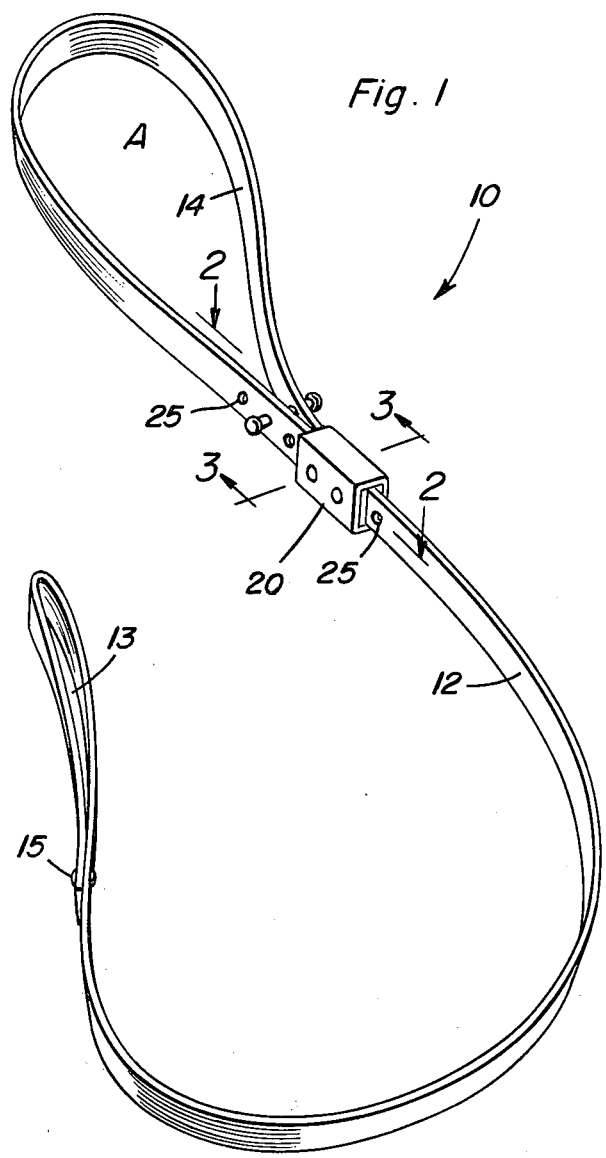
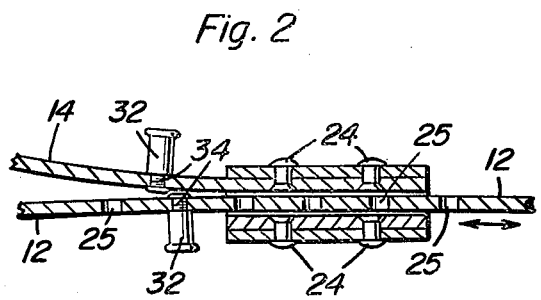
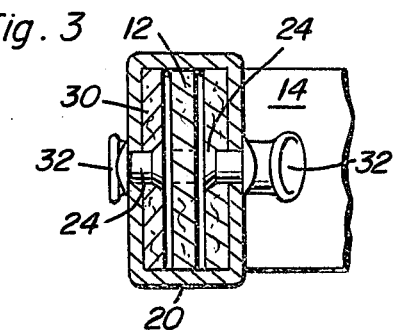
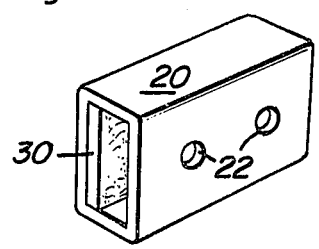
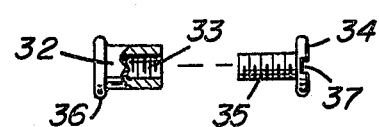
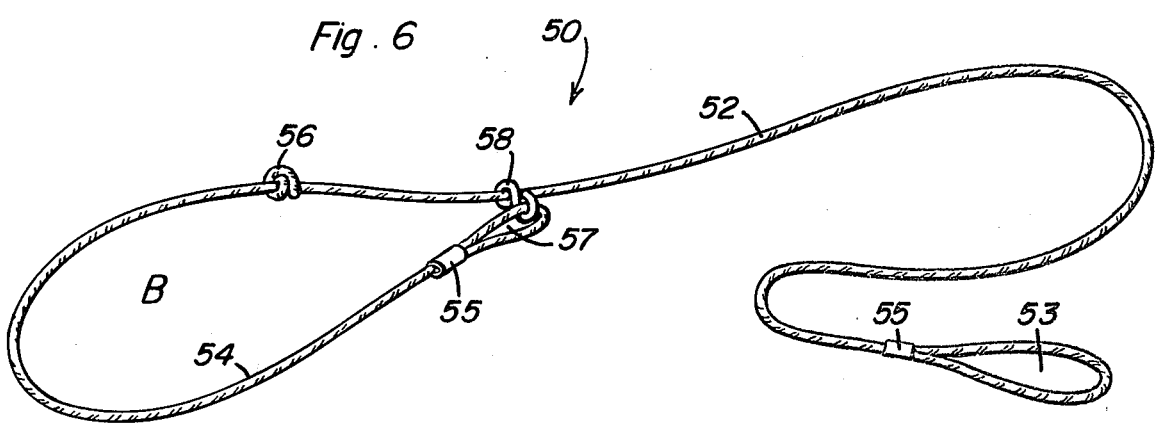

LEASH WITH SLIP LOOP

BACKGROUND OF THE INVENTION

1. Field of the Invention

This invention relates generally to a leash for dogs and other animals which has a slip loop adjustable in size so that said loop may be limited to the proper size for the particular animal to be leashed.

2. Description of the Prior Art

A common problem of leashes for dogs and other animals having slip loop type animal neck engaging means is that the slip loop will tighten too much and choke the animal. It is desirable to have some choking action present in order to maintain proper control of the animal, but it needs to be limited so that the choking action will not be so great as to injure the animal.

Another problem with known leashes for animals is that if they do provide adjusting means for the size of the loop, said adjusting means are complicated and/or difficult to adjust, or many times are not positive in action and allow the adjustment to slip or change. The prior art shows various dog leashes for training and walking dogs such as the patent to Norton U.S. Pat. No. 2,289,802; the patent to Peterlin, U.S. Pat. No. 3,311,088; and the patent to Ollstein, U.S. Pat. No. 3,096,741. Each of these patents has one or more of the limitations as mentioned above. Another patent which may be pertinent to the disclosed invention is the one to Carver, U.S. Pat. No. 1,551,932, which is an adjustable apparatus for holding a child in a seat. None of the known prior art devices offer the simple yet unique structure as disclosed by this invention.

SUMMARY OF THE INVENTION

An object of the present invention is to provide a simple leash for dogs and other animals which has means therewith for limiting the size of the animal neck-engaging loop.

Another object of this invention is to provide a leash having foolproof means for limiting the slip loop neck-engaging portion of the leash.

A further object of this invention is to provide a leash for dogs and other animals having an adjustable means for limiting the minimum size of the slip loop.

A still further object of this invention is to provide a leash having a connector thereon which easily, yet positively, limits the size of the slip loop which engages the animal's neck.

A still further object of this invention is to provide a leash with slip loop which is low in cost, easy to manufacture, and yet foolproof in performance.

One of the big features of the invention disclosed herein is in the fact that the slip loop on the leash may be quickly and easily adjusted for minimum size, and once so adjusted there will be no change or danger that the minimum loop size will decrease so as to choke or injure the animal with which the leash is being used.

Further advantages of the disclosed invention are in the simplicity thereof as well as the low cost thereof, and yet the foolproof, positive action of the slip loop limiting structure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of one preferred embodiment of this invention.

FIG. 2 is a cross-sectional view of a portion of the leash of this invention showing the limit connector taken generally along lines 2—2 of FIG. 1.

FIG. 3 is a cross-sectional view taken along line 3—3 of FIG. 1 showing an end view of said connector.

FIG. 4 is a perspective view of the connector member per se.

FIG. 5 is a view partly in perspective and partly in cross section showing one of the limit stops for use with the leash and connector.

FIG. 6 is a modification of another embodiment of this invention.

DESCRIPTION OF THE PREFERRED EMBODIMENTS

Referring to FIG. 1 of the drawing, reference numeral 10 indicates the preferred embodiment of the leash with a slip loop having a loop limit connector thereon. The main portion of the leash 12 has one end provided with a hand loop 13 formed by doubling over this end of the leash and fastening it by suitable means at 15. The leash material is preferably leather, but to keep the coat down may be of plastic or less expensive material. The other end of the leash 12 has an end 14 which is provided with evenly spaced holes 25 spaced therealong. Between the middle portion of the leash and this end 14 additional evenly spaced holes 25 are provided. The use of said holes will be described in detail below.

A connector member 20, shown best in FIG. 4, comprises a hollow tube-like rectangular unit. The opening within said connector is approximately three times the thickness of the leash 12 and slightly wider than said leash. Holes 22 are provided on each side portion of said connector and an insert member 30 of the same approximate thickness as the leash itself is riveted by means of rivets 24 to one side of said connector. As shown in FIG. 4, this is the side away from the viewer. The other side of the connector, that is the side facing the viewer in FIG. 4, is permanently fastened to the extreme end of the leash portion 14 by similar rivets 24, as best seen in FIG. 2. The leash is then threaded through the remaining center opening of the connector between the end 14 of the leash and the spacing member 40 so that the main body 12 of the leash will pass through the center of the connector between the two portions of leash material as best seen in FIG. 3. This structure forms a strong, rip-proof type connection at the end of the leash and as can be visualized by looking at FIG. 1 allows the size of the loop to be easily changed to fit any size animal.

Stop or limit knobs made of metal (FIG. 5), comprise the knob unit 32 having an enlarged head 36 thereon and being bored and screw-threaded, as shown at 33. The screw-threaded receptacle 33 receives a corresponding screw 35 having a head 34 and screwdriver slot 37 therein. As can best be seen in FIG. 2, the stops may be inserted in the proper holes 25 and the two parts firmly screwed together to form positive limit stops for the connector unit 20. Once the connector unit is adjusted together with the limit stops for the neck size of a particular animal, no further adjustment need be made, and the leash may be used with a slight choking action but said action will be positively limited so that no injury will occur to the animal. The connector block 20 may be of plastic, metal, or similar material.

FIG. 6 shows a modified embodiment of this invention. Shown in general by reference numeral 50, the main body of the leash 52 has at one end thereof a hand holding loop formed therein by doubling said leash back upon itself to form a loop 53 and said doubled end is fastened to the main leash by clamp means 55, said clamp preferably being of metal or plastic material. The other end of the leash has a portion 54 which forms the neck-engaging slip loop portion of the leash and this end similarly has an end doubled back upon itself and clamped by a similar clamp 55 to form a small connector engaging loop 57 therein. The user of this leash will measure the approximate neck size of the animal to be leashed and make an appropriate knot 56 in the leash thereat. A connector means 58 is then fastened through the loop 57 and the other end of the connector means 58 is secured slidably around the main leash body 52, thus the knot 56 will limit the amount of choking which will be permitted by the slip loop B as shown in FIG. 6. For animals of different size an appropriate adjustment of the position of knot 56 must be made by the user. This device does not offer quite the flexibility and convenience of the preferred embodiment of FIG. 1, but it is less expensive than the above.

The invention that is disclosed herein offers a simple, yet effective positive adjustment for slip loops of leashes for dogs and other animals which is new and unique.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A leash for dogs and similar animals wherein it is desirable to have a slip loop for choking purposes to aid in control of the animal comprising; a leash, a hand loop at one end of said leash, a slip loop at the other end of said leash, and means for limiting the minimum loop size which said slip loop can be reduced to for the purpose of preventing injury to the animal, the means for limiting the minimum size of the slip loop including a connector sleeve attached to the extreme other end of said leash and having the main body portion of said leash engaged in a slidable manner therethrough, the said connector sleeve includes a rectangular tube of limited length having two holes through each side thereof, said two holes on one side being double riveted to said extreme end of the leash mounted inside the rectangular tube, at least one limit screw adjustably mounted through one of a plurality of evenly spaced holes in said leash proper for engagement with said connector sleeve to positively limit the minimum slip loop, and the connector sleeve has means for the purpose of reducing friction and reducing side play which includes an additional member riveted on the inside of the sleeve on the portion thereof opposite to the side having the end of said leash attached thereto for the purpose of providing spaced means so that the leash proper will slide inside said connector sleeve between said spacer means and said extreme end of the leash.

2. The device of claim 1 wherein the limit screw has two separable posts and one portion having a threaded aperture therein with an enlarged head on the end opposite to said aperture, and a second portion having screw threads thereon and an enlarged head with screwdriver slots therein for mating with the one portion and completing the limit screw structure.

3. The device of claim 2 wherein the leash itself is made of leather and the hand hold is formed by the end of the leash opposite to said slip loop being doubled back upon itself and appropriately fastened to the main body portion of the leash by riveting.

4. The device of claim 2 wherein the leash itself is made of plastic and the hand hold is formed on the end opposite to said slip loop by folding said leash back upon itself and plastic heat welding the pieces together.

* * * * *